United States Patent [19]

Hostler et al.

[11] Patent Number: 5,109,632

[45] Date of Patent: May 5, 1992

[54] AUTOMATIC INTERLAYER TRIMMING

[75] Inventors: Jonathan E. Hostler, Verona; Frank J. Byers, Pittsburgh, both of Pa.

[73] Assignee: PPG Industries, Inc., Pittsburgh, Pa.

[21] Appl. No.: 503,588

[22] Filed: Apr. 3, 1990

[51] Int. Cl.⁵ .............................................. B24B 21/00
[52] U.S. Cl. ................................. 51/135 R; 51/142; 51/145 R; 51/328
[58] Field of Search ............... 51/328, 135 R, 137, 51/145 R, 142, 103 R, 105 EC, 33 R

[56] References Cited

U.S. PATENT DOCUMENTS

| | | | |
|---|---|---|---|
| 2,562,229 | 7/1951 | Bell | 51/266 |
| 2,579,337 | 12/1951 | Reaser et al. | 51/101 |
| 2,597,180 | 5/1952 | Reaser et al. | 51/101 |
| 2,637,951 | 5/1953 | White | 51/140 |
| 2,926,371 | 3/1960 | Swindler | 15/77 |
| 3,044,222 | 7/1962 | Davis | 51/142 |
| 3,800,609 | 4/1974 | Schaller | 51/141 |
| 4,091,573 | 5/1978 | Schmidt | 51/145 |
| 4,864,775 | 9/1989 | David | 51/142 |
| 4,897,968 | 2/1990 | Hutt | 51/141 |

Primary Examiner—M. Rachuba
Attorney, Agent, or Firm—Andrew C. Siminerio; Donald C. Lepiane; Gay Ann Spahn

[57] ABSTRACT

An automatic interlayer trimming assembly is provided with an abrasive belt that contacts the edge of a windshield assembly after lamination to remove any interlayer that has extruded out from the windshield edge during lamination. The belt is supported and advanced by a plurality of rollers and the windshield edge is moved in the same direction as the advancement of the belt. In addition, the belt may oscillate in a direction perpendicular to the belt advancement to help remove the interlayer.

25 Claims, 6 Drawing Sheets

AUTOMATIC INTERLAYER TRIMMING

BACKGROUND OF THE INVENTION

1. Field of the Invention

This invention relates to the fabrication of laminated transparencies and more particularly to the removal of excess interlayer material about the periphery of a laminated windshield.

2a. Technical Considerations

In a conventional laminated windshield fabrication operation, pairs of glass sheets are initially cut to shape and bent to a desired contour. A flexible, thermoplastic interlayer material, for example polyvinylbutyral, is inserted between pairs of complementing sheets and the assembly is subjected to elevated temperatures and pressures to bond the assembly together and form a unitary structure. During lamination, some portion of the interlayer material is squeezed out, i.e. extruded, from between the glass sheets about the windshield periphery. This material, or trim, must be removed to provide a clean, unobstructed edge about the periphery of the windshield.

The extruded interlayer material is typically removed using a razor blade or other sharp instrument. Using the edge of the windshield as a guide, the interlayer trim is removed from the windshield. It has been found that this procedure does not provide consistent edge quality and may chip one of the glass sheets of the windshield resulting in reduced edge strength.

It would be advantageous to provide a system that removes the extruded interlayer material in a consistently uniform manner without affecting the windshield edge strength.

2b. Patents of Interest

U.S. Pat. No. 2,926,371 to Swindler teaches an edge treating apparatus wherein a bent laminate is conveyed past a brushing tool that treats one edge of the moving laminate. Stops are provided along the opposite edge of the laminate to maintain the first edge against the brush. The stops and brush are mounted on an assembly that swings about a horizontal axis so that the brush and stops can receive and discharge the advancing laminate.

U.S. Pat. Nos. 2,579,337 and 2,597,180 to Reaser et al. teach a glass edge grinding machine. A flat glass sheet is rotated about a vertical axis and its edge is ground to a desired configuration by a grinding wheel.

U.S. Pat. No. 2,637,951 to White teaches the use of a belt driven edging tool. A plurality of belts are positioned diagonally relative to the edge of a glass sheet and the glass sheet is moved between the belts so that the belts contact opposing edges of the sheet. The belts flex between support rollers as the belts contact the glass edge to provide a uniformly ground edge along the opposing edges of the glass sheet, including the corners of the sheet.

U.S. Pat. No. 4,739,590 to Myers et al. teaches a method of seaming a glass sheet. The glass sheet advances in a linear direction between pairs of seaming heads to seam opposing edges of the glass. The glass is then rotated 90° and the remaining opposing edges are seamed.

SUMMARY OF THE INVENTION

The present invention provides an apparatus for removing interlayer trim from the periphery of a laminate. The apparatus includes an abrasive belt that contacts the edge of the laminate to remove the trim. In one particular embodiment of the invention, an advancing abrasive belt that moves along a path defined by a plurality of rollers and the laminate and belt are moved relative to each other such that the belt contacts selected portions of the laminate's edge. The laminate is biased against the belt and advanced and rotated in a manner such that the entire peripheral edge of the laminate progressively contacts the belt. In a preferred embodiment of the invention, the edge of the laminate is positioned generally parallel to the advancing direction of the belt and the belt oscillates in a direction perpendicular to the advancing direction of the belt to remove the interlayer trim. The belt and roller assembly are enclosed within a housing that collects the removed interlayer trim and removes it from the housing.

DETAILED DESCRIPTION OF THE INVENTION

This invention is used to remove interlayer material that has been extruded about the periphery of a windshield during lamination but can be used in any application where there is a need to remove a portion of the edge of a rigid substrate without adversely affecting its edge quality.

Figure 1:
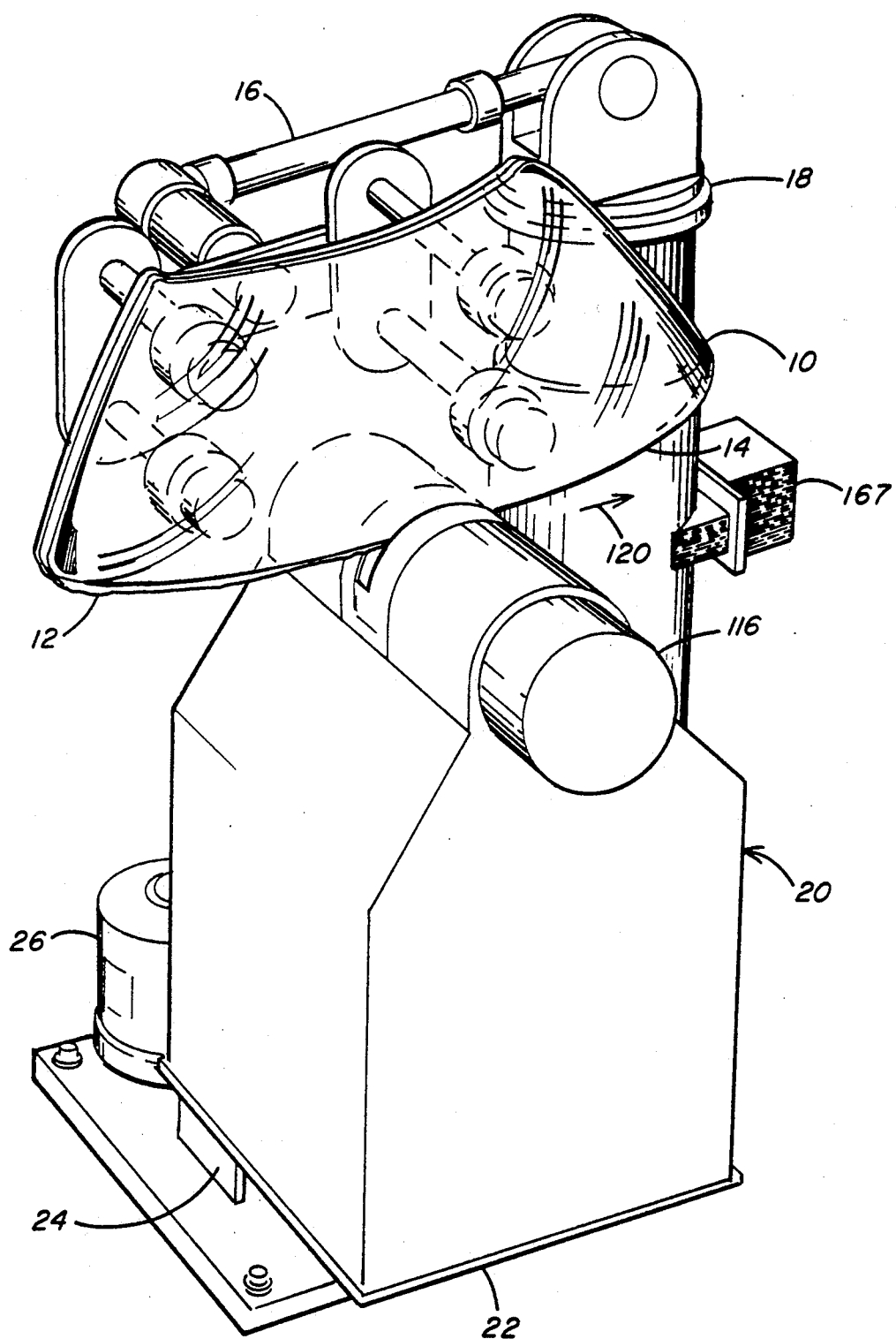
FIG. 1 is a perspective view of a windshield interlayer trimming arrangement incorporating features of the present invention.

FIG. 1 schematically illustrates an interlayer trimming operation incorporating features of the present invention. In particular, a windshield 10 includes a border of interlayer 12 that has been extruded about its peripheral edge 14 during lamination as discussed earlier. Arm 16 of robot 18 engages the windshield 10 and moves it relative to an interlayer removal assembly 20, which is the subject of the present invention, to trim the interlayer 12 from the windshield 10 in a manner to be discussed later.

Referring to FIGS. 2 through 5, the assembly 20 includes a housing 22, a main support 24 and a drive assembly 26. The housing 22 includes an outer shell 28, cover plate 30 (shown only in FIGS. 3, 4 and 5) and rear housing plate 32 which encloses a roller and belt assembly 34 that advances a continuous abrasive belt within the housing 22 to remove the interlayer 12 from the windshield 10. Although not limiting in the present invention, in the particular embodiment illustrated in FIGS. 2 through 5, assembly 34 is oscillated within housing 22 in the direction indicated by arrow 36, for reasons that will be discussed later.

Figure 2:
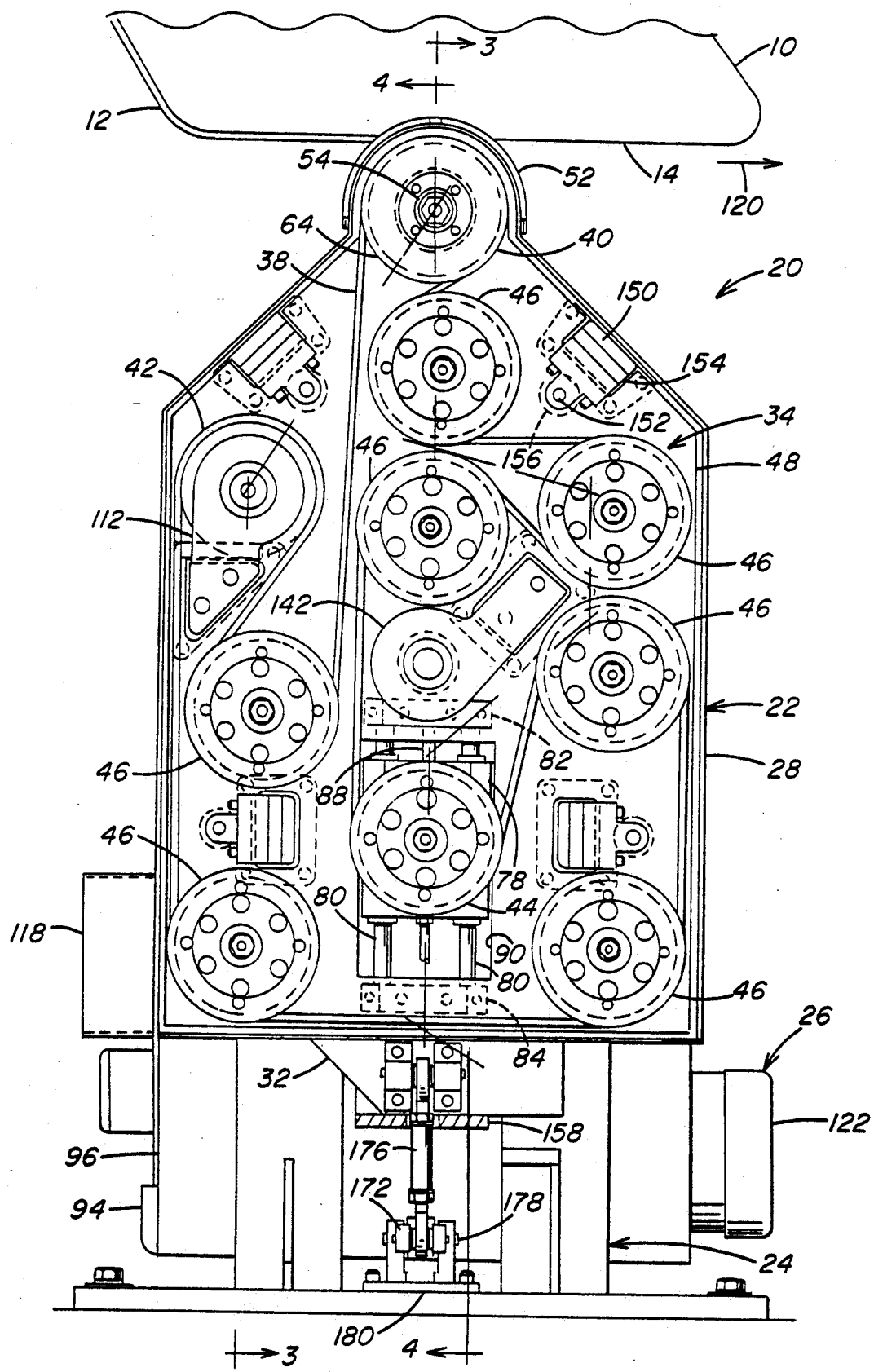
FIG. 2 is a front elevational view of the interlayer trimming arrangement shown in FIG. 1, illustrating the roller and belt assembly, with portions removed for clarity.
Figure 3:
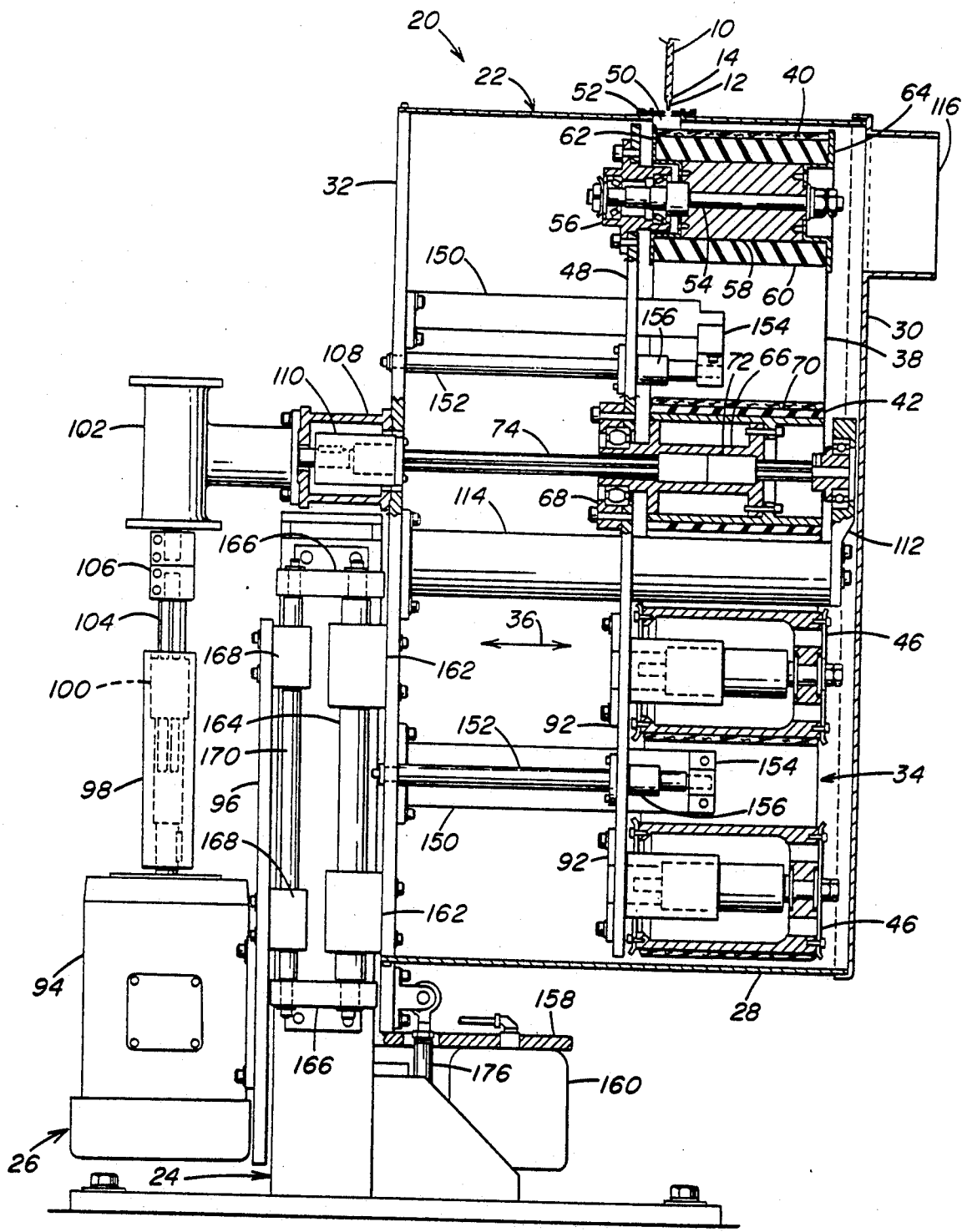
FIG. 3 is a view through line 3—3 of FIG. 2 illustrating the belt drive assembly, with portion removed for clarity.
Figure 4:
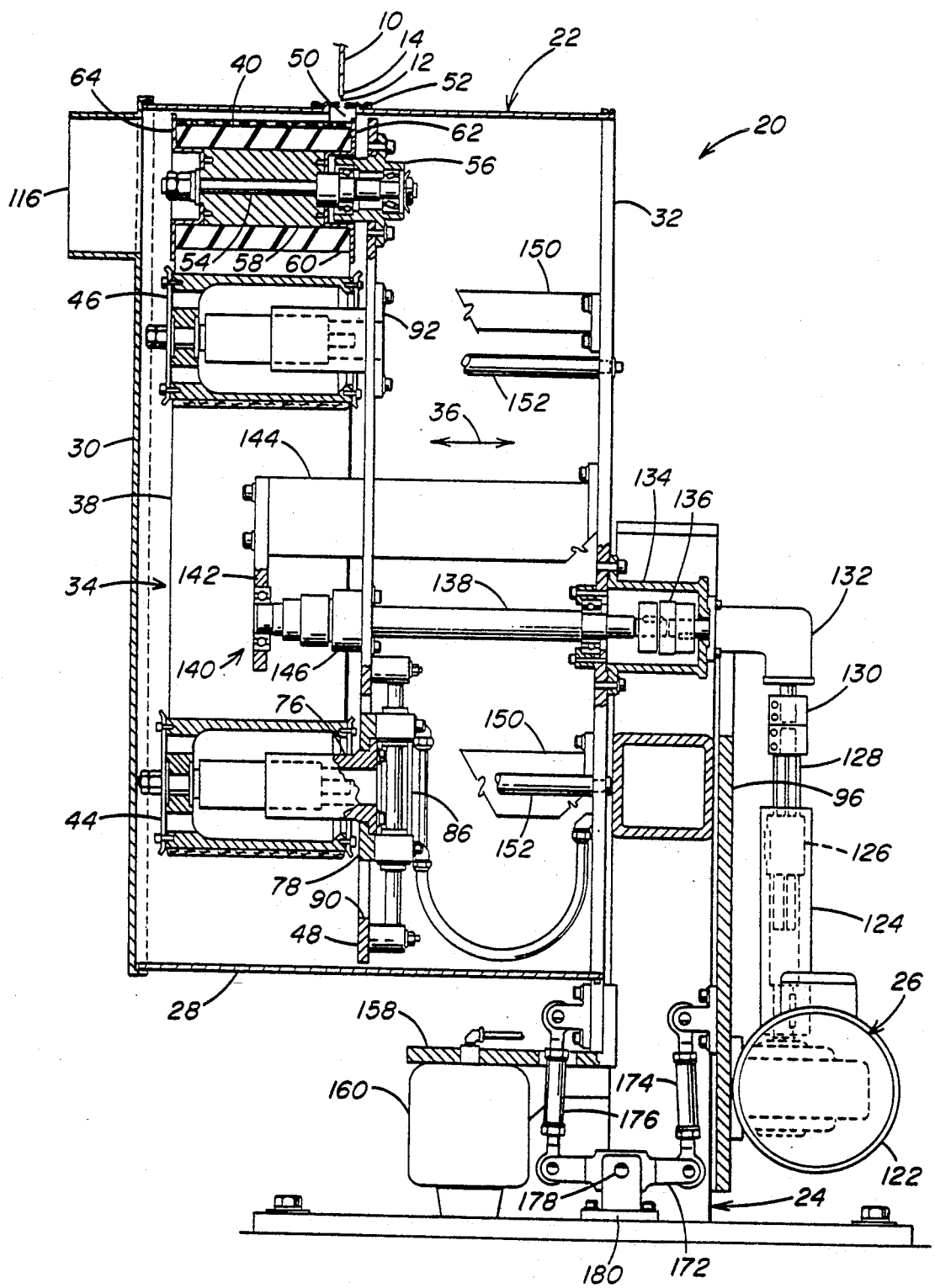
FIG. 4 is a view through line 4—4 of FIG. 2 illustrating the belt and roller oscillating assembly, with portion removed for clarity.

With continued reference to FIGS. 2 through 4, assembly 34 includes a plurality of rollers which direct an abrasive belt 38 in a desired configuration through housing 22. The rollers include a contact roller 40, a drive roller 42, a tensioning roller 44, and the plurality of free-wheeling idler rollers 46. Each of the rollers 40, 42, 44 and 46 is mounted on a roller plate 48 which supports the rollers while the assembly 34 oscillates within housing 22. Contact roller 40 is positioned at windshield edge opening 50 and contacts the edge of the windshield 10 as the windshield 10 is moved through opening 50 to trim the excess interlayer 12 about its periphery. Seal 52 helps maintain the removed interlayer within the housing 22. The contact roller 40 includes a shaft 54 mounted on plate 48 via roller bearing 56, roller hub 58 and outer facing 60. Flanges 62 and 64 are secured to opposing ends of the roller 40 to maintain the position of the belt 38 on the facing 60. The facing 60 is preferably a compliant material which allows the abrasive belt 38 to generally conform to the edge configuration of the windshield 10 as the robot 18 (shown only in FIG. 1) biases the windshield 10 against the belt 38 at the contact roller 40 to remove the interlayer 12 extruded from the windshield's edge 14. The compliancy of the facing 60 at the point of contact between the windshield edge 14 and roller 40 will compensate for any mismatch of the edges of the glass sheets forming the windshield 10. Although not limiting in the present invention, facing 60 is preferably a urethane rubber with a 50A durometer hardness. This preferred hardness allows the facing 60 to be soft enough to comply with the edge 14 of the windshield 10 but hard enough to be durable. As an alternative, the roller 40 may be a pneumatic wheel (which will be discussed later with respect to FIG. 6) which is pressurized to provide the required compliancy. Referring to FIGS. 2 and 3, drive roller 42 includes a hub 66 mounted on plate 48 via the roller bearing 68 and outer mandrel 70. Mandrel 70 is preferably an elastomeric material that will grip the backing of the belt 38 and provide the necessary friction to drive belt 38 with the housing 22. Splined collar 72 is positioned within hub 66 to receive splined drive shaft 74 so that roller 42 can continue to be driven as the assembly 34 oscillates within the housing 22, which will be discussed later. Referring to FIGS. 2 and 4, tensioning roller 44 is mounted via roller mount 76 to tensioning bracket 78 which slides along guide 80 between upper and lower brackets 82 and 84. Tensioning cylinder 86 (shown only in FIG. 4) is mounted to bracket 78 with arm 88 secured to upper bracket 82. To apply additional tension to the belt 38, cylinder 86 is pressurized to extend arm 88 (shown only in FIG. 2) and move support bracket 78 and roller 44 downward along guide 80 and within opening 90 of plate 48. Each of the remaining idler rollers 46 are free-wheeling rollers mounted on plate 48 via idler roller mount 92.

Figure 5:
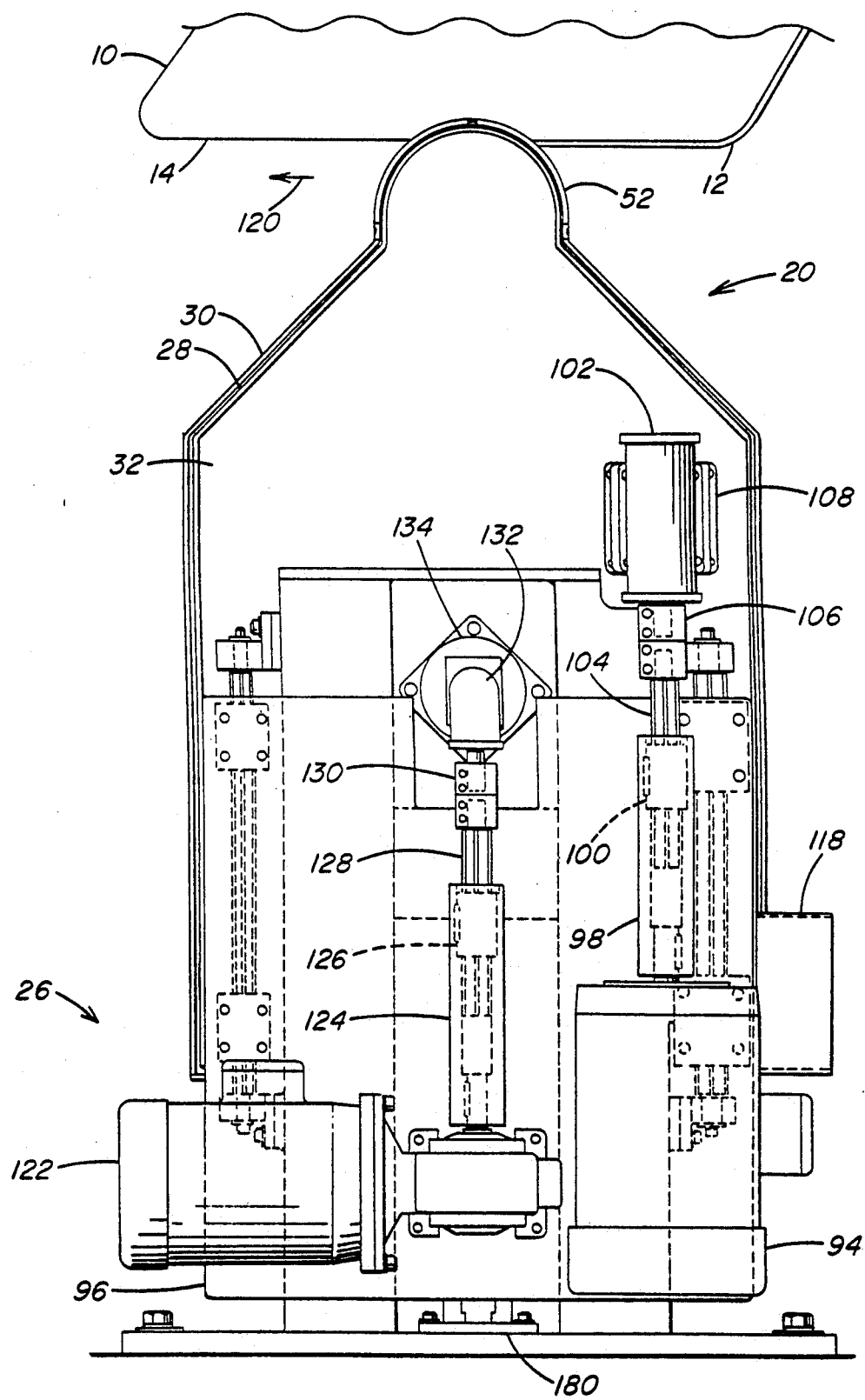
FIG. 5 is a rear elevational view of the trimming arrangement illustrating the drive assemblies.

Referring to FIGS. 2, 3 and 5, drive roller 42 is driven by motor 94 of drive assembly 26 which is mounted on drive plate 96, as will be discussed latter. Collar 98 with splined bearing housing 100 extends from the motor 94 and is connected to right angle gear box 102 through splined bearing shaft 104 and shaft coupling 106. Gear box 102 is mounted on rear housing plate 32 via gear box mount 108 which includes a splined coupling collar 110 to support one end of drive shaft 74 and interconnect it with the gear box 102. The opposite end of the drive shaft 74 is rotatably supported by drive post bracket 112. Drive post 114 is secured to rear housing plate 32 and extends through an opening (not shown) in the roller plate 48 to support bracket 112.

During operation, in one particular embodiment of the invention, the robot 18 lifts the windshield 10 from a conveyor (not shown) after it has been aligned or from an autoclave rack (not shown) and transfers the windshield 10 to the assembly 20. The robot 18 inserts the windshield 10 into opening 50 of the housing 22 to contact windshield edge 14 with the belt 38 at contact roller 40 of the assembly 20 and then advances and rotates the windshield 10 relative to the belt 38 so that selected portions of the edge 14, and preferably the entire peripheral edge, contacts the abrasive belt 38 at contact roller 40 to remove the extruded interlayer 12 from the windshield 10.

The interlayer 12 removed by the assembly 20 is contained within housing 22. Vacuum connections 116 and 118 are made to the housing 22 to remove the trimmed interlayer 12 and prevent it from affecting the operation of the roller and belt assembly 34.

It has been observed that the removal of the excess interlayer 12 from the windshield 10 is most effective when the windshield 10 is perpendicular to the belt 38 as shown in FIGS. 1 through 5 and is moved relative to the belt 38 in a direction indicated by arrow 120 which is parallel with the rotational movement of the belt 38 on the contact roller 40, as shown in FIGS. 1, 2 and 5. This preferred orientation of the windshield 10 relative to the belt 38 maintains a rigid axis parallel to the windshield edge 14 as the interlayer 12 is removed from the windshield 10. To this end, the robot 18 is programmed, in any convenient manner known in the art, to continuously rotate the windshield 10 relative to the abrasive belt 38 on contact roller 40 to progressively contact the entire windshield edge 14 with the belt 38 while keeping the edge 14 of the windshield 10 generally perpendicular to the belt 38. In should be noted that since the windshield 10 has already been shaped, the robot 18 will be required to move and rotate the windshield 10 along three mutually orthogonal axes.

Although the windshield 10 and assembly 20 are moved relative to each other such that the assembly 20 is preferably oriented perpendicular to the tangent of the glass/belt contact point and the belt 38 moves parallel to the windshield 10 movement, testing has shown that interlayer 12 can be effectively removed when the belt 38 is moved perpendicular to the windshield movement, i.e. the belt 38 moves across the edge 14 rather than parallel to it. However some edge scratching has been observed with this orientation.

It has been found that interlayer removal may be improved by moving the belt 38 and windshield edge 14 generally perpendicular to each other as the windshield 10 advances along direction 120 so that the belt 38 "scrubs" the edge 14. Although not limiting in the present invention, in the preferred embodiment, the belt and roller assembly 34 oscillates in a back and forth direction indicated by arrow 36 in FIGS. 3 and 4. In addition, the oscillating motion allows the use of a wider abrasive belt 38. By oscillating the belt and roller assembly 34, the entire belt width (except for a marginal outside edge portion) may be used to remove interlayer 12 and the removal operation will not concentrate removal of the interlayer 12 at any particular location along the belt 38 width which could lead to accelerated wear, clogging and premature failure of the belt 38.

With continued reference to FIGS. 4 and 5, oscillating motor 122 of the drive assembly 26 is mounted on the drive plate 96, as will be discussed later, and includes a collar 124 with splined bearing housing 126 which receives one end of splined shaft 128. The opposite end of shaft 128 is connected by a shaft collar 130 to a right angle gear box 132 which is mounted on rear housing plate 32 via gear box mount 134. Mount 134 includes a shaft coupling 136 which interconnects the gear box 132 with one end of a shaft 138 of oscillating assembly 140. The shaft 138 extends through an opening (not shown) in the roller plate 48 and its opposite end is rotatably supported by oscillator post bracket 142. Oscillator post 144 is secured to the rear housing plate 32 and extends through an opening (not shown) in roller plate 48 to support post bracket 142. Oscillator nut 146 of the assembly 140 moves along oscillator shaft 138 as it is rotated by motor 122 and is secured to roller plate 48 such that the plate 48, along with the entire roller and belt assembly 34, moves back and forth as indicated by arrow 36 as nut 146 oscillates along shaft 138. An assembly 140 oscillates the roller and belt assembly 34, splined collar 72 slides along drive shaft 74 to maintain driving engagement between drive roll 42 and motor 94 as shown in FIG. 3. Although not limiting in the present invention, in one particular embodiment the oscillating assembly 140 is a ball reverser assembly available from Flennor Incorporated, Connecticut. This assembly provides rapid deceleration and acceleration of the nut 146 as it reverses direction along shaft 138 to provide even belt wear.

In order to direct the oscillating movement of the assembly 34 and maintain alignment of the assembly 34 within the housing 22, a set of guides 148 are positioned within the housing 22. Although not limiting in the present invention, in the particular embodiment shown in FIGS. 2, 3 and 4, each guide 148 extends through an opening (not shown) in the roller plate 48 and includes a bearing post 150 secured to the rear housing plate 32 and a bearing shaft 152 secured between bracket 154 of post 150 and the rear housing plate 32. Collar 156 is slidably mounted about shaft 152 and secured to roller plate 48 to guide its oscillating movement.

Although in the preferred embodiment of the invention the belt and roller assembly 34 oscillates within the housing 22 as the belt 38 is conveyed within the housing 22 to effect the preferred movement of the belt 38 relative to the edge of the windshield 10, it would be obvious to one skilled in the art that based on the teachings of the present invention the belt and roller assembly 34 could remain stationary and the robot 18 could oscillate the windshield 10 in a direction perpendicular to the advancement of the windshield 10 along the belt 38 to provide the same interlayer removing action between the belt 38 on the windshield 10 as described above.

In addition to the contact roller 40 having a compliant outer layer facing 60 which, when the windshield 10 is biased against the belt 38 at contact roller 40, conforms to the contour of the windshield edge 14, the preferred embodiment of the invention also allows the entire housing 22 to move vertically in response to a downward pressure applied by the robot 18 through the windshield 10 as the assembly 20 removes the excess interlayer 12. Referring to FIGS. 3 and 4, a bracket 158 is fixed to the lower end of the rear mounting plate 32. A resilient member, for example a spring (not shown) or an air bladder 160, is positioned beneath the bracket 158 to support the housing 22 and provide additional compliancy to the overall assembly 20. In particular, as the downward pressure applied by the windshield 10 varies, the bladder 160 will deform and resist the downward pressure but will allow some downward movement of the housing 22 to provide additional compliancy. Collars 162 are fixed to rear plate 32 and are slidably secured to vertical guide shafts 164, which are mounted on brackets 166 of the main support 24, to direct and guide the vertical movement of the housing 22 as shown in FIGS. 3 and 5. As housing 22 moves up and down in response to the pressure applied by the windshield 10, shaft 104 slides within bearing housing 100 of collar 98 to maintain driving engagement between the motor 94 and drive roller 42 to continue driving the belt 38 within the housing 22. Similarly, shaft 128 slides within bearing housing 126 of collar 124 to maintain driving engagement between the oscillating motor 122 and oscillating shaft 138 so that the belt and roller assembly 34 continues to oscillate as the housing 22 moves as shown in FIGS. 4 and 5. In addition, a controller 167 (shown only in FIG. 1) may be connected to the robot 18 to keep track of the number of windshields 10 that are trimmed by belt 38. Based on this number, controller 167 can monitor the wear of said belt 38 by determining the number of inches of windshield edge that has been trimmed and increase the pressure in the bladder 160 to account for increased wear in the belt 38 and continue to properly remove the interlayer trim 12.

Although not limited in the present invention, in the preferred embodiment, the drive assembly 26 is mounted in a manner which reduces the size of the bladder 160 required to support the housing 22 while continuing to provide the necessary compliant force to the assembly 20 required during removal operation. As discussed earlier, the motors 94 and 122 are each mounted on drive plate 96 as shown in FIGS. 3, 4, and 5. Plate 96 is slidably supported on the main support 24 via collars 168 and guide shafts 170 which are mounted from bracket 166. One end of a rocker arrangement 172 is secured to the rear mounting plate 32, which supports the entire weight of the housing 22 via link 174, while the other end of rocker arrangement 172 is secured to drive plate 96, which supports the motors 94 and 122 via link 176 so that the weight of the housing 22 and the drive assembly 26 is supported by rocker pin 178 of bracket 180 as shown in FIG. 4. The weight of each assembly can be adjusted and/or counterbalanced so that the bladder 160 does not have to support the weight of the housing 22 but only provide the necessary resistive force required to allow the contact roller 40 and belt 38 to conform to the windshield edge 14 as the windshield 10 moves within housing 22. Referring to FIG. 4, it can be seen that as the windshield 10 exerts a downward force which moves the housing 22 downward along guide shaft 164 and is resisted by the bladder 160, the rocker arrangement 172 would cause the drive assembly 26 to move upward along guide shafts 170. As the housing 22 and drive assembly 26 move relative to each other, shafts 104 and 128 slide within collars 98 and 124, respectively, to maintain driving engagement between the motor 94 and drive roller 42 and the motor 122 and oscillating shaft 138, respectively.

Although not limiting in the present invention, in the preferred embodiment of the invention illustrated in FIG. 2, the belt 38 is conveyed in a serpentine configuration within housing 22. One purpose for this type of configuration is to increase the overall length of the belt 38 and therefore increase the belt life and reduce the frequency at which the belt 38 must be changed. However, the present invention is not limited to any particular length of belt or roller and belt assembly 34 configuration. Based on the disclosures in this invention it is obvious that a single roller (not shown) with an abrasive surface may be used to remove excess interlayer 12 from a windshield 10 as will be discussed later.

In one particular embodiment of the invention, the belt 38 is an open web, very fine grade silicon carbide mineral belt with a low stretch backing available from 3M Corporation under the trademark Scotchbrite. It should be noted that other grades of belt may be used. However, it has been observed that coarse and medium grade belts tend to scratch the edge of the windshield while fine and very fine grade belt do not. Furthermore, the fine and very fine grade belts have been found to improve the quality of the windshield edge by partially smoothing small chips or defects along the glass edge and polishing the edge so as to provide a better edge appearance and increase the edge strength. Testing indicates that a belt 7 inches×175 inches (28.8 cm by 444.5 cm) belt rotated at a belt speed of approximately 350 inches per second (8.9 meters per second) and oscillated at a rate of approximately 0.5 inches/sec (1.27 cm/sec) will remove approximately 50 inches of interlayer per square inch of belt at a rate of approximately 7 inches of interlayer per second (approximately 19.7 cm of interlayer per square centimeter of belt at a rate of approximately 18 cm of interlayer per second). In the preferred embodiment of the invention, the full belt width is not used to remove the interlayer 12 but rather the oscillating motion provides an outer border of approximately ½ inch (1.24 cm) outer edge of the belt 38 that is not used. It should be appreciated that the life of the belt 38 may be changed by modifying the operating parameters of the assembly 20, such as for example, belt speed and length, hardness of the outer facing of the contact roller 40, type interlayer removed, and the resistive force exerted by the bladder 160. In addition, a brush (not shown) may be used to contact and remove interlayer 12 from the belt 38 to prolong the belt life. Furthermore, it has been observed that cooling the belt 38, for example by circulating cold air within the housing 22, will prolong belt life.

The temperature of the extruded interlayer 12 will also affect the belt life and efficiency of the interlayer removal operation. If the interlayer 12 is too cold, it becomes hard and more difficult to remove. If the interlayer 12 is too hot, it becomes too soft and clogs the belt 38. Although not limiting in the present invention, it is preferred that the temperature of the interlayer 12 to be removed be within the range of approximately 70° to 120° F. (21° to 49° C.) during removal operation.

Based on the teachings of this disclosure, it is obvious that the rocker assembly 172 could be eliminated and the drive assembly 26 be secured to the housing 22 so that the bladder 160 would support the entire weight of the assembly 20. With such an arrangement, the splined shafts 104 and 128 and corresponding collars 98 and 124 could be replaced with fixed shafts and couplings (not shown) since the housing 22 would not move vertically relative to the drive assembly 26. Guide shafts 164 and 170 would continue to direct the vertical movement of the assembly 20. Furthermore, plate 96 can be eliminated and motors 94 and 122 can be mounted in a stationary manner on separate support strands (not shown). As the housing 22 moves, shafts 104 and 128 will slide within collars 98 and 124, respectively, to maintain driving engagement between the motor 94 and drive roller 42 and the motor 122 and oscillating shaft 138, respectively, in a manner similar to that discussed earlier.

Although in the preferred embodiment of the invention the windshield edge 14 contacts the belt 38 at contact roller 40, based on the teachings of this disclosure, it would be obvious to one skilled in the art that the point of contact between the belt 38 and windshield can be at a different location. For example, the edge 14 could contact the belt 38 at a location intermediate the rollers. The deflection of the belt 38 as the windshield 10 is biased against it will result in the belt 38 generally conforming to the shape of the edge 14.

Figure 6:
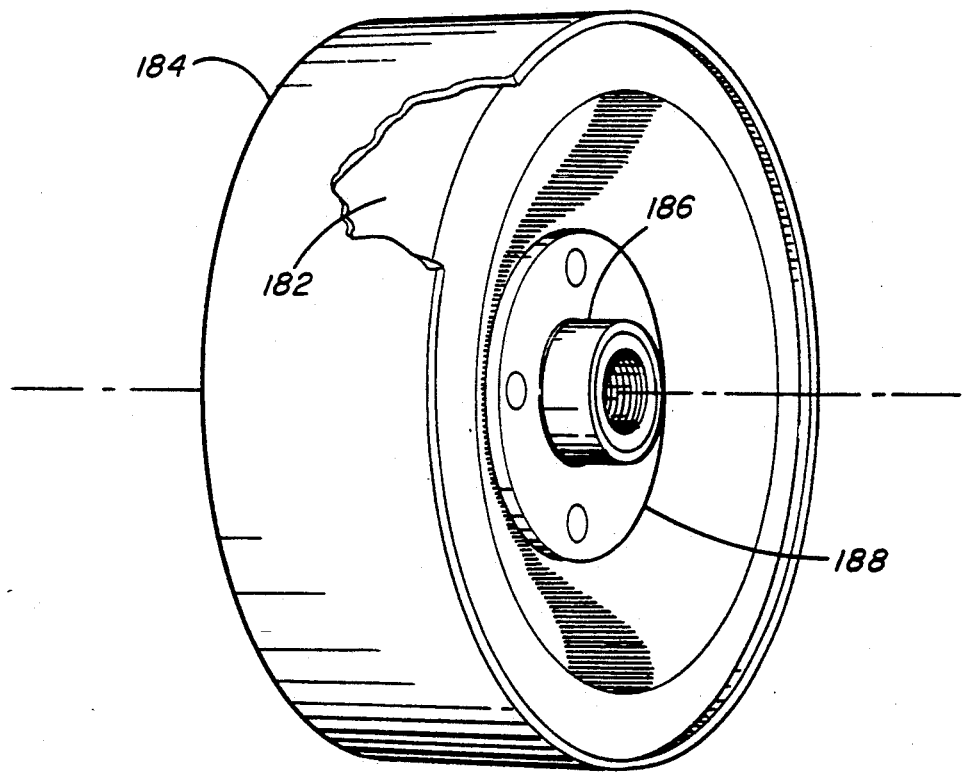
FIG. 6 is an exploded view of an alternate embodiment of the invention, with portions removed for clarity.

Furthermore, although the embodiment of the invention shown in FIGS. 1 through 5 includes a belt 38 conveyed by a plurality of rollers, based on the teachings of this invention it would be obvious that the roller and belt assembly 34 of the trim assembly 20 can be replaced with a compliant wheel 182 supporting an abrasive belt 184 as shown in FIG. 6. The wheel 182 is supported by hub 186 between end plates 188 (only one shown in FIG. 6) and is rotated by a drive motor (not shown). Wheel 182 is preferably pneumatic so that it can be inflated to support the belt 184 and provide the compliancy required to conform the belt 184 to the edge configuration of the windshield. Wheel 182 may be supported to provide linear compliancy and to oscillate in a direction parallel to the axis of rotation of the wheel 182, in a manner similar to that discussed earlier. In one particular embodiment of the invention, the wheel 182 is a pneumatic wheel available from Dynabrade, Inc., New York, and sold under the trademark Dynacushion. The belt 184 is an 3.5 inches wide by 15.5 inches long (8.9 cm by 39.5 cm) aluminum oxide belt also available from Dynabrade, Inc.

The assembly 20 taught in the present invention removes extruded interlayer that protrudes about the periphery of a laminated transparency without reducing the edge strength and in some cases increasing edge strength by removing imperfections about the windshield periphery.

The forms of this invention shown and described in this disclosure represent illustrative embodiments and it is understood that various changes may be made without departing from the scope of the invention.

We claim:

1. An apparatus for removing excess interlayer extending beyond the edges of a laminate, said laminate having an interlayer material between and bonded to a pair of glass sheets, said glass sheets having a predetermined peripheral shape and size and cross-sectional edge configuration, comprising:
   an abrasive belt;
   at least one roller to support said belt, said roller being capable of conforming to said cross-sectional edge configuration of said sheets;
   means to provide relative movement between said laminate and said belt; and
   means to urge said belt and said edge of said laminate toward one another to apply sufficient pressure to said edge of said laminate to remove said excess interlayer without substantially altering said predetermined peripheral shape and size and cross-sectional edge configuration of said glass sheets.

2. The apparatus as in claim 1 further including means to rotate said roller about an axis and means to oscillate said roller along said axis.

3. The apparatus as in claim 2 wherein said at least one roller includes a plurality of rollers, and at least one of said plurality of rollers is a contact roller having a compliant facing capable of conforming to said edge configuration of said glass sheets which are laminated together.

4. The apparatus as in claim 2 wherein said roller is a pneumatic wheel.

5. The apparatus as in claim 1 wherein said at least one roller includes a plurality of rollers and at least one of said plurality of rollers is a contact roller rotating about an axis and positioned such that said edge portions of said laminate contact said belt at said contact roller and further including means to oscillate said rollers and belt in a direction generally parallel to said axis.

6. The apparatus as in claim 5 wherein said contact roller includes a compliant facing to allow said abrasive surface to conform to said edge configuration of said edge of said sheets in contact with said belt at said contact roller.

7. The apparatus as in claim 6 further including means to permit movement of said rollers and belt in a linear direction generally perpendicular to said contact roller axis in response to a force applied to said contact roller by said laminate and further including means to resist said force.

8. The apparatus as in claim 7 further including means to monitor the amount of trim removed from said laminate and means responsive to said monitoring means to adjust said resisting means.

9. The apparatus as in claim 8 further including a housing to enclose said rollers and said belt and a support stand having means to mount said housing to said support stand and further wherein said permitting means includes slides to direct the movement of said housing relative to said stand.

10. The apparatus as in claim 5 further including a housing to enclose said rollers and said belt and means to remove trim materials removed from said edge of said laminate from said enclosure.

11. The apparatus as in claim 9 wherein said rollers further include a drive roll and said advancing means includes a roller motor and further including means to maintain driving engagement between said drive roll and said motor.

12. The apparatus as in claim 11 wherein said rollers are mounted on a roller plate and said oscillating means includes means operatively interconnecting an oscillating drive and said roller plate to oscillate said rollers and belt.

13. The apparatus as in claim 12 further including means to mount said roller motor and oscillating drive on a drive plate, means to slidably secure said drive plate to said support stand and means interconnecting said drive plate and said housing such that said drive plate moves in response to said linear movement of said housing.

14. A method of removing excess interlayer extending beyond peripheral edges of a laminate, said laminate having an interlayer between and bonded to a pair of glass sheets, said glass sheets having a predetermined edge configuration, said method comprising the steps of:
  moving a belt with an abrasive surface and said laminate relative to one another; and
  urging the abrasive surface of the belt and selected edge portions of the laminate toward one another with sufficient pressure to conform said belt to said edge portions of said glass sheets to remove said excess interlayer without substantially altering said edge configuration of said sheets.

15. The method as in claim 14 further including the step of maintaining said selected edge portions generally perpendicular to said direction of belt movement at a point of contact between said edge portions and said belt.

16. The method as in claim 14 further including the step of maintaining said selected edge portions generally parallel to said direction of belt movement at a point of contact between said edge portions and said belt.

17. The method as in claim 16 further including the step of providing relative movement between said selected edge portions and said belt in a direction generally perpendicular to said direction of belt movement during said moving and urging steps.

18. The method as in claim 17 further including the step of maintaining said laminate generally perpendicular to said abrasive surface.

19. The method as in claim 17 including the step of maintaining the temperature of said excess interlayer in a range of approximately 70° to 120° F. during said moving and urging steps.

20. The method as in claim 17 including the step of permitting linear movement of said belt in response to a force applied to said belt by said laminate.

21. The method as in claim 20 further including the step of providing a force to said belt to resist said force applied by said laminate.

22. The method as in claim 21 further including the step of monitoring wear of said abrasive surface and increasing said resistive force in response to increased wear of said abrasive surface.

23. The method as in claim 17 including the step of conforming said surface of said belt to the shape of said selected edge portions of said laminate during said moving and urging steps.

24. A laminate made by the method recited in claim 14.

25. A laminate made by the method recited in claim 17.

* * * * *